(12) United States Patent  
Vanderheyden

(10) Patent No.: US 7,706,101 B2  
(45) Date of Patent: Apr. 27, 2010

(54) TRANSDUCER POSITIONING ASSEMBLY

(75) Inventor: William J. Vanderheyden, Loveland, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 336 days.

(21) Appl. No.: 11/949,892

(22) Filed: Dec. 4, 2007

(65) Prior Publication Data

US 2009/0141405 A1 Jun. 4, 2009

(51) Int. Cl.
*G11B 5/596* (2006.01)

(52) U.S. Cl. .................................... 360/78.12
(58) Field of Classification Search ............. 360/78.12, 360/78.05, 75, 69, 77.06, 77.12, 294.5, 267.7
See application file for complete search history.

(56) References Cited

U.S. PATENT DOCUMENTS

| | | | | |
|---|---|---|---|---|
| 3,924,268 | A | * | 12/1975 | McIntosh et al. .......... 360/78.05 |
| 4,875,120 | A | * | 10/1989 | Takahashi et al. ......... 360/267.7 |
| 5,111,348 | A | * | 5/1992 | Baba ....................... 360/77.06 |
| 5,216,559 | A | * | 6/1993 | Springer .................. 360/294.5 |
| 6,342,987 | B1 | * | 1/2002 | Hattori et al. ............ 360/78.05 |
| 6,430,008 | B1 | | 8/2002 | Trabert et al. |
| 6,437,946 | B2 | | 8/2002 | Todd |
| 6,690,535 | B2 | | 2/2004 | Wang |
| 6,710,967 | B2 | | 3/2004 | Hennecken et al. |
| 6,744,594 | B2 | | 6/2004 | Denison et al. |
| 6,768,606 | B2 | | 7/2004 | Helms |
| 6,775,092 | B2 | * | 8/2004 | Zweighaft et al. ......... 360/77.12 |
| 6,781,784 | B2 | | 8/2004 | Peterson |
| 6,985,430 | B1 | | 1/2006 | Villiard et al. |
| 7,123,450 | B1 | | 10/2006 | Villiard et al. |
| 7,218,480 | B1 | | 5/2007 | Yeakley et al. |

* cited by examiner

*Primary Examiner*—Fred Tzeng
(74) *Attorney, Agent, or Firm*—Brooks Kushman P.C.

(57) ABSTRACT

An actuator assembly is provided for positioning a transducer with a primary frame and a secondary frame mounted thereto for transverse translation. A coarse actuator is connected to the frames for translating the secondary frame incrementally. A carriage with a transducer is mounted to the secondary frame for transverse translation. A fine actuator is connected to the secondary frame and the carriage. The coarse actuator provides coarse adjustment and the fine actuator provides fine adjustment of the transducer for following tape. A method for positioning a transducer is provides a transducer connected to a coarse actuator and a fine actuator. Tape is conveyed across the transducer and lateral motion of the tape is monitored. The transducer is positioned by the fine actuator relative to a lateral tape position, and if the position exceeds a predetermined range, then the transducer is positioned by the actuation of the coarse actuator.

20 Claims, 5 Drawing Sheets

TRANSDUCER POSITIONING ASSEMBLY

BACKGROUND

1. Technical Field

The invention relates to assemblies for positioning a transducer.

2. Background Art

The prior art has offered transducer positioning assemblies that utilize a single actuator for positioning a transducer relative to a media that is conveyed across the transducer. The single actuator is employed for aligning the transducer with the media and for positioning the transducer in response to lateral movement of the media. Thus, the single actuator is utilized for conveying the transducer across a total range of lateral media movement.

Examples of prior art transducer positioning assemblies are disclosed in U.S. Pat. No. 6,437,946 B2, which issued to Todd on Aug. 20, 2002; U.S. Pat. No. 6,985,430 B1, which issued to Villiard et al. on Jan. 10, 2006; and U.S. Pat. No. 7,123,450 B1, which issued to Villiard et al. on Oct. 17, 2006; the disclosures of which are incorporated in their entirety by reference herein.

SUMMARY

One embodiment of the invention discloses an actuator assembly for positioning a transducer. The assembly includes a primary frame and a secondary frame mounted to the primary frame for transverse translation relative to the primary frame. A coarse actuator is connected to the primary frame and the secondary frame for translating the secondary frame. A carriage is mounted to the secondary frame for transverse translation relative to the secondary frame. A transducer is mounted to the carriage. A fine actuator is connected to the secondary frame and the carriage. The coarse actuator provides coarse adjustment of the secondary frame, the carriage and the transducer relative to a media for actively following the media by incremental adjustment of the transducer. The fine actuator provides fine adjustment of the carriage and the transducer relative to the media.

A further embodiment discloses a controller in cooperation with a coarse actuator and fine actuator of an actuator assembly. The controller receives a signal of lateral tape position and actuates the fine actuator in response to the lateral tape position to align the transducer with the lateral tape position. The controller determines if the lateral tape position exceeds a predetermined range. If the lateral tape position exceeds the predetermined range, the controller actuates the coarse actuator to overlap the lateral tape position with the predetermined range.

Another embodiment discloses a method for positioning a transducer by providing a transducer connected to a coarse actuator and a fine actuator for transverse positioning of the transducer. Tape is conveyed across the transducer and lateral motion of the tape is monitored to determine a lateral tape position. The transducer is positioned by actuation of a fine actuator to align the transducer with the lateral tape position. If the lateral tape position exceeds a predetermined range, the transducer is positioned by actuation of a coarse actuator to overlap the lateral tape position with the predetermined range.

The above embodiments, and other embodiments, features, advantages, and benefits of the invention are readily apparent from the following detailed description of embodiments of the invention when taken in connection with the accompanying drawings.

DETAILED DESCRIPTION OF EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Figure 1:
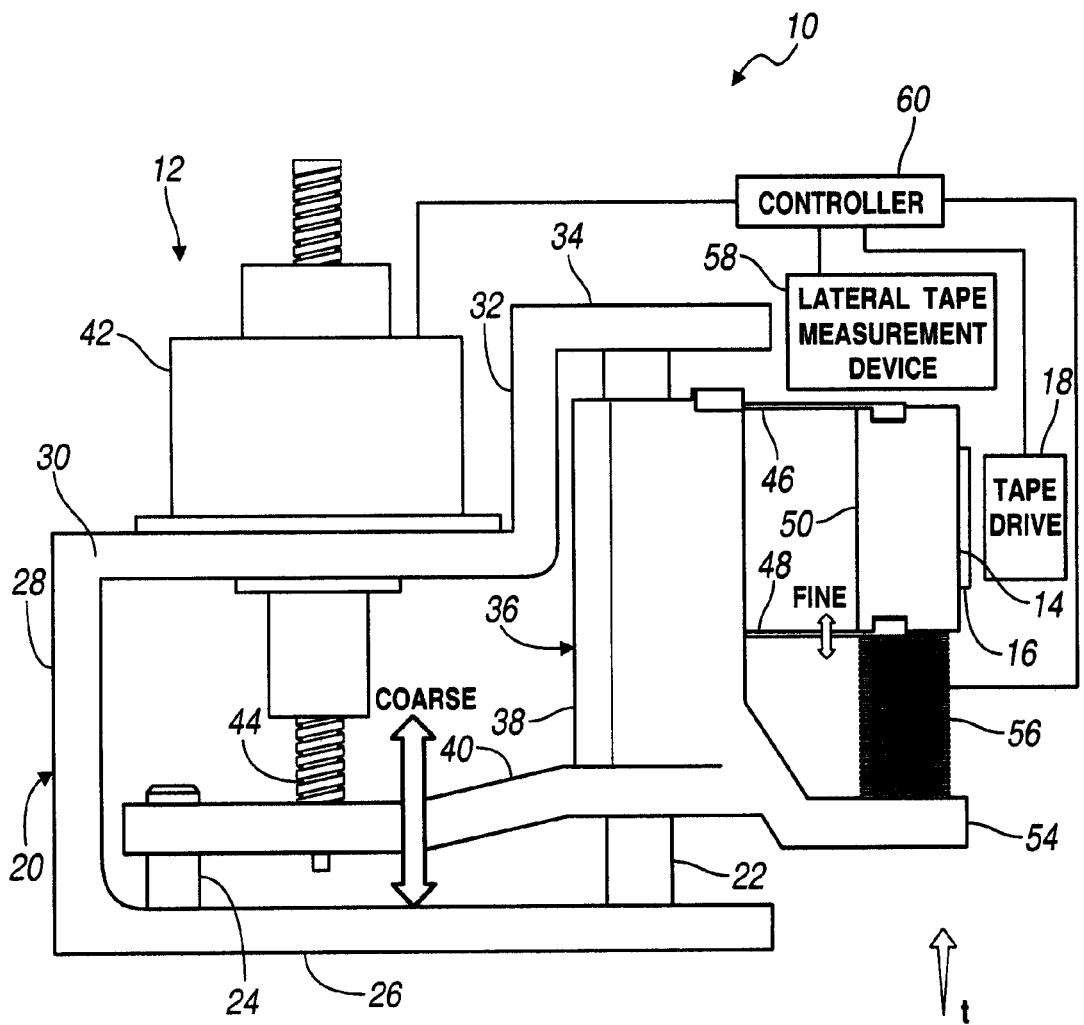
FIG. 1 is a side elevation view of an actuator assembly for positioning a transducer in accordance with an embodiment of the present invention.

The embodiments as set forth in FIG. 1 generally illustrate and describe a controller and other such electrically based components. All references to the controller and electrically based components and the functionality provided for each, are not intended to be limited to encompassing only what is illustrated and described herein. While particular labels may be assigned to the controller and/or the electrical components disclosed, such labels are not intended to limit the scope of operation for the controller and/or the electrical components. The controller may be combined with other controllers and/or separated in any manner based on the particular type of electrical architecture that is desired or intended to be implemented in the system.

Referring now to FIG. 1, a system for positioning a transducer is illustrated schematically and referenced by numeral 10. This system 10 includes an actuator assembly, which is illustrated in detail and is referenced generally by numeral 12. The actuator assembly 12 is utilized for positioning a transducer 14. The transducer 14 is utilized for cooperating with media 16 that is conveyed across the transducer 14. In the depicted embodiment, the media 16 is tape, which is conveyed longitudinally by a tape drive 18 across the transducer 14. A longitudinal direction of the tape 16 is perpendicular to a plane that illustrates FIG. 1. The tape 16 includes multiple tracks that are oriented in a track direction or a transverse direction, which is indicated by an arrow T in FIG. 1. As the tape 16 is conveyed longitudinally across the transducer 14, the tape 16 moves in a lateral direction of the tape, which is parallel to the transverse direction T.

The actuator assembly 12 is employed to maintain the transducer 14 in alignment with tracks of the tape 16. The tape 16 experiences lateral tape motion that has both high frequencies with small amplitudes and low frequencies with high amplitudes. In order to address these conditions, the prior art actuator assemblies that employ one actuator include trade offs in the design. For example, prior art actuator assemblies that employ one actuator that is mounted to leaf spring type flexures, the stiffness of the leaf springs must be low enough to permit the transducer to travel to cover a full range of lateral tape motion. The reduced stiffness of the flexures results in out of plane resonances in low frequency, high amplitude tape motions. Thus, single actuator designs limit the effective frequency range for the associated prior art actuator assembly. The actuator assembly 12 addresses the low frequency, high amplitude motion and the high frequency, small amplitude motion by utilizing an actuator for addressing each type of motion. By dedicating an actuator for each type of motion, track position error is reduced. By reducing the position error, narrower tracks are permitted on the tape 16, thereby resulting in enhanced data capacity on the tape 16 in comparison to prior art systems.

The actuator assembly 12 includes a fixed frame 20 that is fixed relative to the system 10. The frame 20 includes a guide, which in one embodiment is provided by a pair of transverse guide shafts 22, 24 extending from a base 26 of the frame 20. The frame 20 includes a cross member 28 extending from the first side member 26 for supporting a second side member 30. In at least one embodiment, such as the embodiment depicted, the frame 20 includes a second cross member 32 for extending a distal portion 34 of the second side member 30 apart from the distal end of the first side member 26. One of the guide shafts 22 extends from the distal portion 34 of the second side member 30 to a distal end of the first side member 26.

A movable frame 36 includes a body 38 that is mounted on the guide shaft 22 for linear translation in the transverse direction T along the guide shaft 22. The movable frame 36 includes an extension arm 40 that extends rearward between the side members 26, 30 of the fixed frame 20. The extension arm 40 is mounted to the second guide shaft 24 for linear translation in the transverse direction T. Thus, the second frame 36 moves linearly along the guide shafts 22, 24 in the transverse direction T and the second guide shaft 24 prevents rotation of the movable frame 36 about the first guide shaft 22. The movable frame 36 may include bushings or bearings about the guide shafts 22, 24 to provide bearing support and reduce friction for travel of the movable frame 36 along the guide shafts 22, 24.

The actuator assembly 12 includes a coarse actuator, which in at least one embodiment has a stepper motor 42 mounted to the second side member 30 of the fixed frame 20. The stepper motor 42 drives a lead screw 44 that is connected to the extension arm 40 of the movable frame 36. The stepper motor 42 provides coarse adjustment of the transducer 14 and responds to low frequency, high amplitude lateral tape movement of the tape 16.

A pair of flexure members 46, 48 extend from the body 38 of the movable frame 36. The flexure members 46, 48, are leaf springs 46, 48 according to at least one embodiment of the invention. Of course, other flexure members are contemplated within the spirit and scope of the present invention. A carriage 50 is mounted to the flexure members 46, 48 for linear translation in the transverse direction T due to flexing of the flexure members 46, 48 relative to the movable frame 36. The transducer 14 is oriented on an outboard side of the carriage 50 to cooperate with an external media such as the tape 16, and for transverse positioning provided by movement of the carriage 50.

The movable frame 36 includes a bracket 54 extending from the body 38 and transversely spaced apart from the carriage 50. A fine actuator is mounted to the bracket 54 and connected to the carriage 50 for translating the carriage 50 in the transverse direction T relative to the movable frame 36. In at least one embodiment, the fine actuator is a piezoelectric stack 56 for providing linear translation to the carriage 50. In another embodiment, the fine actuator is a voice coil motor 56 for providing the linear translation of the carriage 50. Of course, other fine actuators are contemplated within the spirit and scope of the present invention.

The fine actuator 56 provides relatively fine adjustment of the carriage 50 relative to the second frame 36 for following high frequency, small amplitude lateral motions of the tape 16. Since the coarse actuator, stepper motor 42, provides the adjustment in response to low frequency, high amplitude tape motion, the fine actuator 56 is only responsible for high frequency, small amplitude motion. The coarse actuator 42 actively follows the tape by incremental adjustment and therefore the fine actuator is limited to a narrow range of motion that is dedicated to the small amplitude, high frequency motion of the tape. Since a narrower range of motion is required from the carriage 50, stiffer flexure members 46, 48 can be employed thereby reducing resonances as a result of translation of the carriage 50 and as a result of the narrower range of motion required by the flexure members 46, 48.

The system 10 includes a lateral tape position measurement device 58 for measuring the lateral tape position of the tape 16. The lateral tape position measurement device 58 may be any known or suitable lateral tape position measurement device such as that disclosed in U.S. Pat. No. 6,768,606 B2, which issued on Jul. 27, 2004 to Helms and is incorporated in its entirety by reference herein. Alternatively, the lateral tape measurement device 58 may be provided in the carriage 50 for measuring the lateral tape movement of the tape 16 and conveying the information to the system 10. The lateral tape measurement device 58 measures a lateral tape position of the tape 16 and conveys the position to the actuators 42, 56 through a controller 60.

According to one embodiment of the invention, if the fine actuator 56 approaches one of the limits of its range of travel, stepper motor 42 provides coarse positioning such that the range of travel of the fine actuator 56 is centered or near center. Alternatively, the position of the fine actuator 56 can be monitored periodically and if the carriage 50 is at a high or low position, then the coarse actuator 42 is actuated to center the fine actuator 56. Thus, the coarse actuator 42 follows the tape movement with incremental adjustment, which is an improvement over the prior art single actuator designs, which utilize coarse adjustment for band movement.

Figure 2:
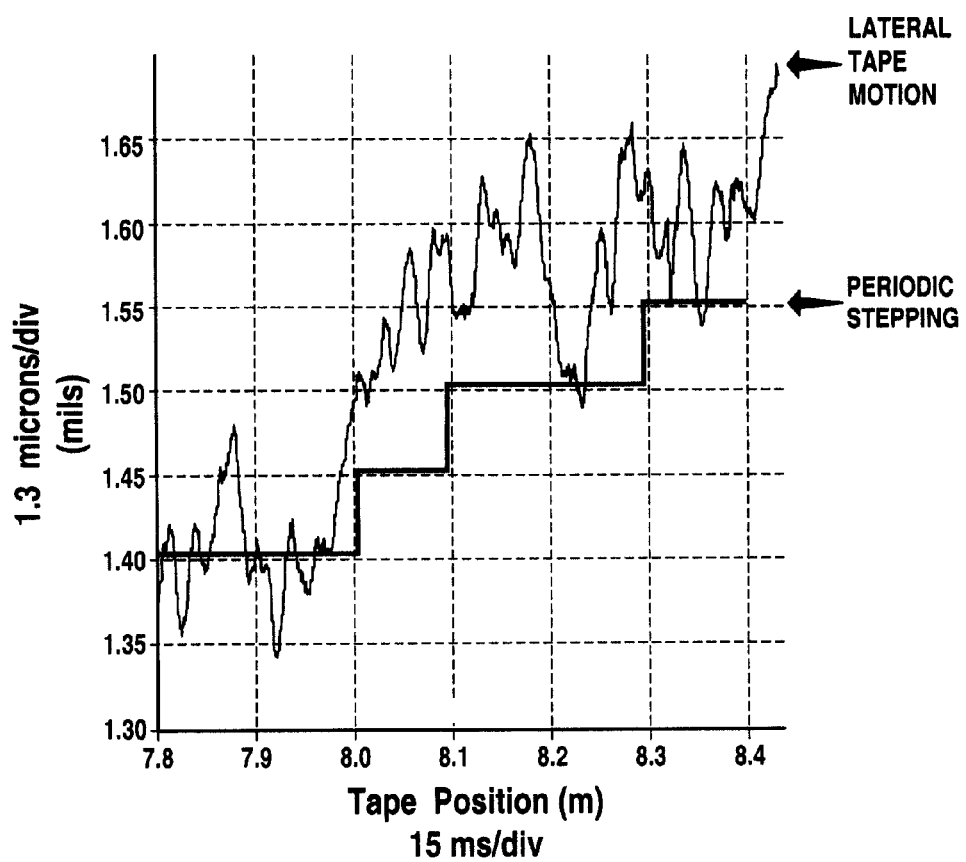
FIG. 2 is a graph of linear tape position versus lateral tape position and coarse actuator position.

Referring now to FIG. 2, a graph of linear tape position is illustrated versus lateral tape position and coarse actuation. Linear tape position is illustrated along the abscissa with divisions of fifteen milliseconds, to track the linear travel of the tape as it is conveyed as a function of time. The ordinate illustrates 1.3 microns per division. In this graph, lateral tape motion is illustrated indicating a typical representation of lateral tape motion as a function of time. The lateral tape motion is monitored and every fifteen milliseconds, if the fine travel actuator 56 is more than two microns off center, then the coarse actuator 42 is stepped 1.3 microns in the direction of the offset. Thus, the low frequency, high amplitude changes in lateral tape motion are addressed by positioning with the coarse actuator 42 to maintain the fine actuator 56 near center to the range of lateral tape motion.

Figure 3:
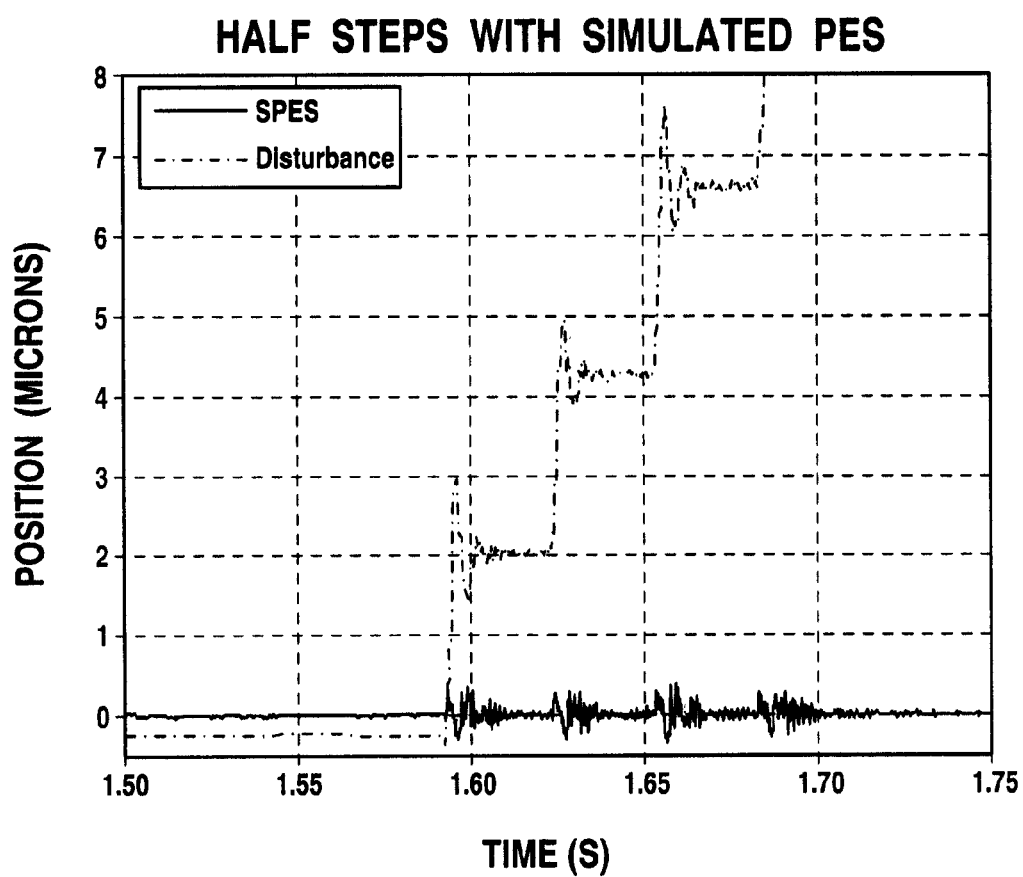
FIG. 3 is a graph of time versus simulated position error signal and disturbance for one coarse actuation increment.

Referring now to FIG. 3, time is the value of the abscissa, and position in microns is the value of the ordinate. The position of the transducer is illustrated for the line labeled disturbance. The steps in the position of the transducer indicate steps of the stepper motor 42 of two microns or greater. As illustrated on the disturbance graph, each step of the coarse actuator 42 results in a resonance within the position of the transducer. This resonance can result in a position error signal (PES). Also illustrated on the graph, is a simulated position error signal with the simulated PES graphed versus time. As indicated, with each step of the coarse motor 42, the resonances result in a simulated position error signal of approximately 0.5 micron or less.

Figure 4:
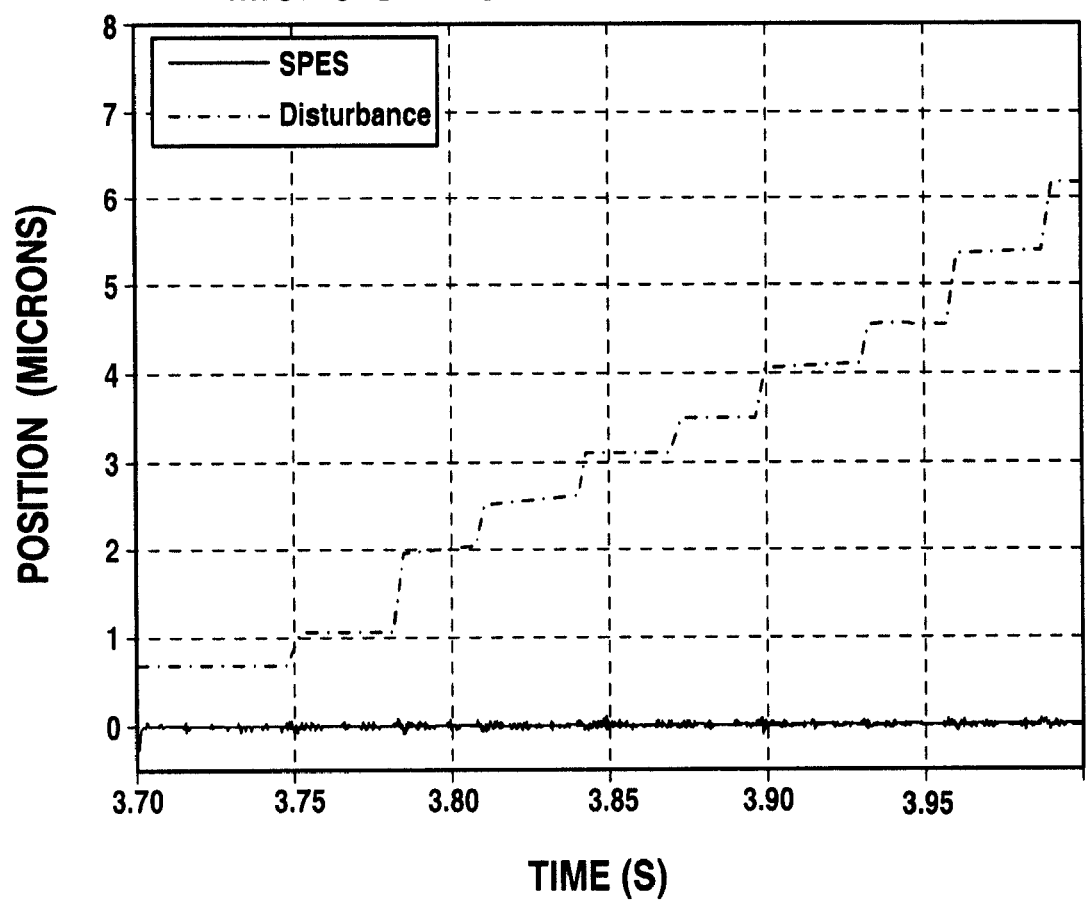
FIG. 4 is another graph of time versus simulated position error signal and disturbance for another coarse actuation increment.

Referring now to FIG. 4, a similar graph is illustrated to that of FIG. 3, with much smaller incremental steps of the coarse actuator 42. Specifically, steps of approximately one micron or less are illustrated for the coarse motor 42. With relatively stiff flexure members 46, 48 in comparison to the prior art and with coarse adjustment of one micron or less, simulated position error signals of approximately 0.1 micron or less are illustrated. Thus, position error signals can be dramatically reduced by reducing the incremental steps of the coarse motor 42. Further, position error signals can be greatly reduced in comparison to that of the prior art by utilizing a coarse actuator 42 in combination with a fine actuator 56. The position error signals may be controlled during operation by reducing the incremental steps of the stepper motor 42, within the incremental limits of the stepper motor 42. Alternatively, the method of reducing the incremental positioning by the coarse motor 42 and simulating the position error signal can be utilized for sizing a coarse motor 42 for a particular application. As illustrated in FIG. 4, since position error signal can be greatly reduced by utilization of two actuators for positioning the transducer 14, narrower track widths may be employed for the tape 16, and more data capacity can be stored on the tape 16.

Figure 5:
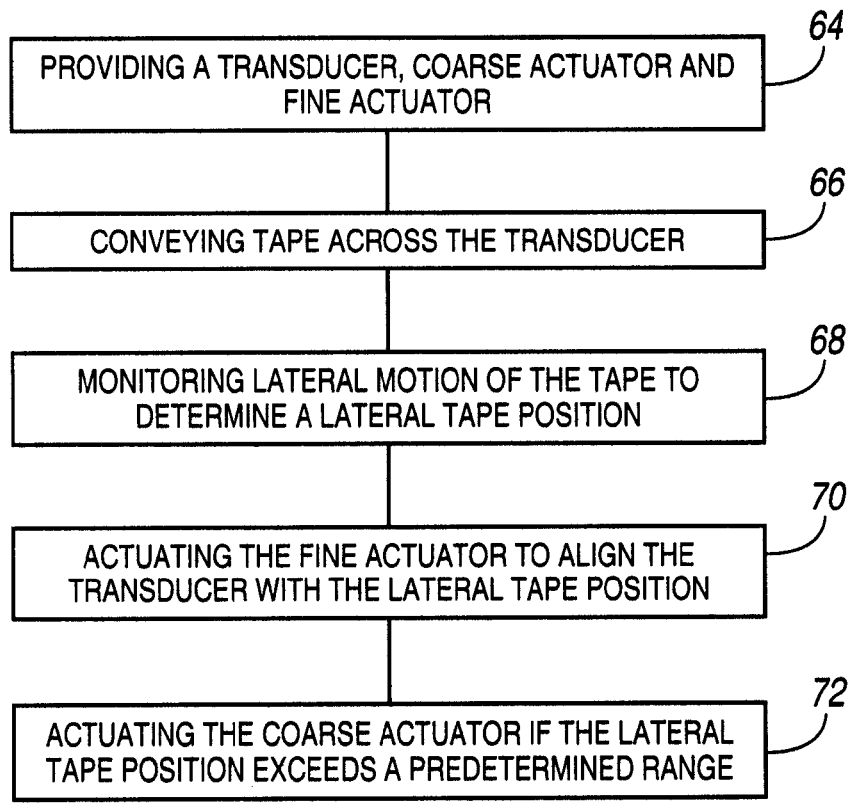
FIG. 5 is a flowchart for a method for positioning a transducer according to another embodiment of the present invention.

Referring now to FIG. 5, a method for positioning a transducer is depicted according to one embodiment of the invention. At block 64, a transducer, coarse actuator and fine actuator are provided. At block 66, tape is conveyed across the transducer. At block 68, the lateral motion of the tape is monitored to determine a lateral tape position. Block 70 illustrates actuating the fine actuator to align the transducer with the lateral tape position. Block 72 depicts actuating the coarse actuator if the lateral tape position exceeds a predetermined range. For example, the predetermined range could be two microns (FIG. 3), or one micron or less (FIG. 4), if less position error signal is desired. According to at least one embodiment, blocks 66-72 are controlled by the controller 60 illustrated in the system 10 of FIG. 1.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An actuator assembly for positioning a transducer comprising:
    a primary frame;
    a secondary frame mounted to the primary frame for transverse translation relative to the primary frame;
    a coarse actuator connected to the primary frame and the secondary frame for translating the secondary frame;
    a carriage mounted to the secondary frame for transverse translation relative to the secondary frame;
    a transducer mounted to the carriage; and
    a fine actuator connected to the secondary frame and the carriage;
    wherein the coarse actuator provides coarse adjustment of the secondary frame, carriage and the transducer relative to a media for actively following the media by incremental adjustment of the transducer, and the fine actuator provides fine adjustment of the carriage and the transducer relative to the media.

2. The actuator assembly of claim 1 wherein the transducer further comprises a tape head and the media further comprises tape that is conveyed across the tape head.

3. The actuator assembly of claim 2 wherein the transverse translation is generally parallel to a lateral direction of the tape for positioning the tape head in response to lateral movement of the tape as the tape is conveyed across the tape head.

4. The actuator assembly of claim 1 further comprising a transverse guide mounted to the primary frame, wherein the secondary frame is mounted to the transverse guide for translation along the guide.

5. The actuator assembly of claim 4 wherein the transverse guide further comprises a pair of guide shafts.

6. The actuator assembly of claim 1 wherein the coarse actuator further comprises a stepper motor.

7. The actuator assembly of claim 6 wherein the stepper motor is mounted to the primary frame.

8. The actuator assembly of claim 7 further comprising a lead screw driven by the stepper motor and connected to the secondary frame for translating the secondary frame relative to the primary frame.

9. The actuator assembly of claim 1 wherein the fine actuator further comprises a voice coil motor.

10. The actuator assembly of claim 1 wherein the fine actuator further comprises a piezoelectric stack.

11. The actuator assembly of claim 1 further comprising a pair of flexure members extending from the secondary frame, wherein the carriage is mounted to the pair of flexure members.

12. The actuator assembly of claim 11 wherein the pair of flexure members further comprise a pair of leaf springs.

13. The actuator assembly of claim 1 further comprising a controller in cooperation with the coarse actuator and the fine actuator, the controller being adapted to:
    receive a signal of lateral tape position;
    actuate the fine actuator in response to the lateral tape position to align the transducer with the lateral tape position;
    determine if the lateral tape position exceeds a predetermined range; and
    actuate the coarse actuator if the lateral tape position exceeds the predetermined range, to overlap the lateral tape position with the predetermined range.

14. A method for positioning a transducer comprising:
    providing a transducer connected to a coarse actuator and a fine actuator for transverse positioning of the transducer;
    conveying tape across the transducer;
    monitoring lateral motion of the tape as the tape is conveyed across the transducer to determine a lateral tape position;
    positioning the transducer by actuation of the fine actuator to align the transducer with the lateral tape position; and
    positioning the transducer by actuation of the coarse actuator if the lateral tape position exceeds a predetermined range, to overlap the lateral tape position with the predetermined range.

15. The method of claim 14 wherein the predetermined range of lateral tape position is less than or equal to a range of positioning provided by the fine actuator.

16. The method of claim 14 further comprising periodically determining the lateral position of the tape and if the lateral tape position exceeds the predetermined range, then positioning the transducer by actuation of the coarse actuator to overlap the lateral tape position with the predetermined range.

17. The method of claim 16 further comprising incrementally positioning the transducer by actuation of the coarse actuator.

18. The method of claim 17 further comprising:
measuring lateral tape position error of the transducer during actuation of the coarse transducer; and
reducing the increment of the positioning of the transducer by the coarse actuator, if the lateral tape position error is greater than a predetermined value.

19. A system for positioning a transducer comprising:
a primary frame;
a transverse guide mounted to the primary frame;
a secondary frame mounted to the transverse guide for translation along the guide;
a stepper motor mounted to the primary frame;
a lead screw driven by the stepper motor and connected to the secondary frame for translating the secondary frame relative to the primary frame;
a pair of flexure members extending from the secondary frame;
a carriage mounted to the pair of flexure members for transverse translation relative to the secondary frame;
a transducer mounted to the carriage;
a fine actuator connected to the secondary frame and the carriage; and
a controller in cooperation with the stepper motor and the fine actuator, the controller being adapted to:
receive a signal of lateral tape position,
actuate the fine actuator in response to the lateral tape position to align the transducer with the lateral tape position,
determine if the lateral tape position exceeds a predetermined range, and
actuate the stepper motor if the lateral tape position exceeds the predetermined range, to overlap the lateral tape position with the predetermined range.

20. The system of claim 19 further comprising:
a tape drive for conveying tape across the transducer; and
a lateral tape position measurement device for measuring the lateral tape position, the measurement device being in communication with the controller for communicating the lateral tape position to the controller.

* * * * *